Jan. 18, 1949.　　　　　E. L. MENTOR　　　　　2,459,237
SELF-CONTAINED SWITCHBOARD AND
CABLE CONNECTIONS THEREIN
Filed Nov. 26, 1945　　　　　　　　　　　　　3 Sheets-Sheet 1

INVENTOR.
EUGENE L. MENTOR.
BY
Chas. T. Hawley
ATTORNEY.

Jan. 18, 1949.  E. L. MENTOR  2,459,237
SELF-CONTAINED SWITCHBOARD AND
CABLE CONNECTIONS THEREIN
Filed Nov. 26, 1945  3 Sheets-Sheet 3
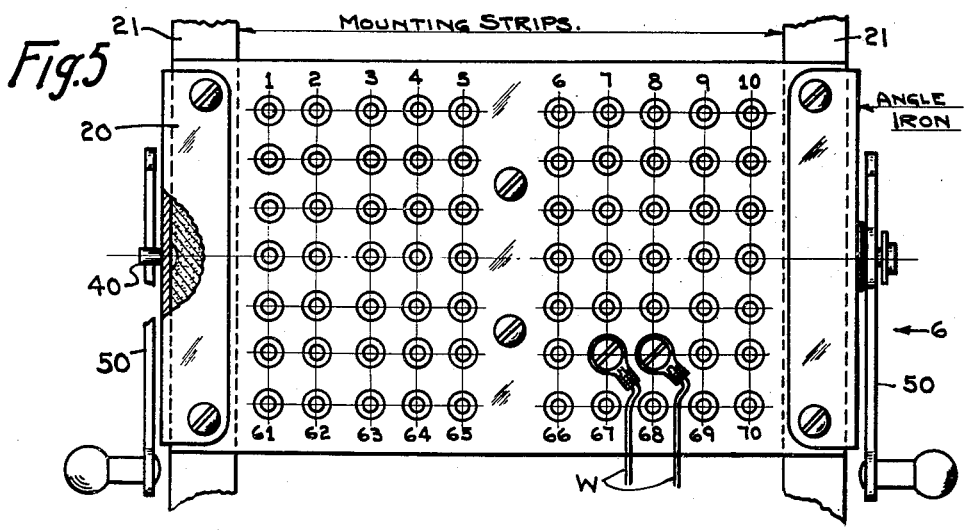
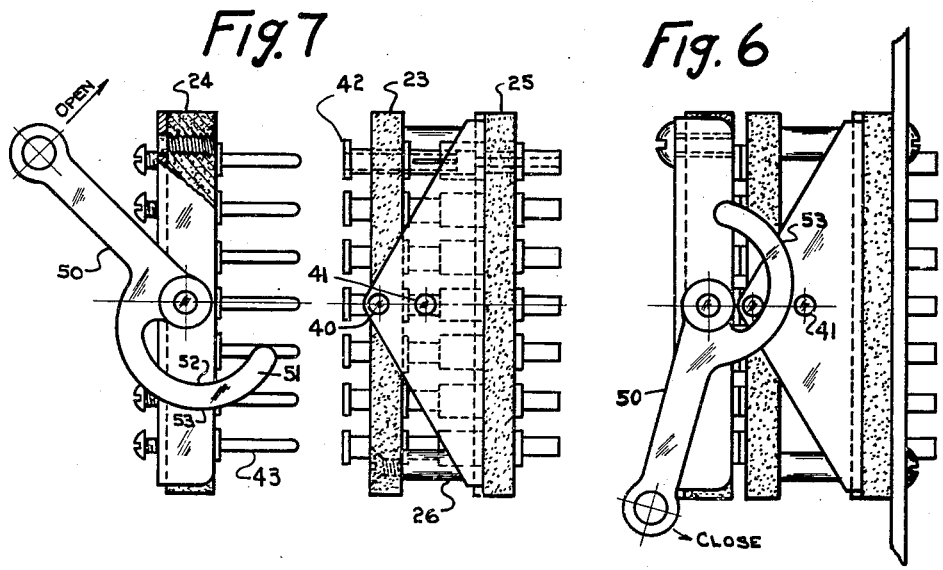
INVENTOR.
EUGENE L. MENTOR.
BY
Chas. T. Hawley
ATTORNEY.

Patented Jan. 18, 1949

2,459,237

UNITED STATES PATENT OFFICE 2,459,237

SELF-CONTAINED SWITCHBOARD AND CABLE CONNECTIONS THEREIN

Eugene L. Mentor, Westminster, Mass., assignor to Simplex Time Recorder Co., Gardner, Mass., a corporation of Massachusetts Application November 26, 1945, Serial No. 630,915

6 Claims. (Cl. 179—91)

This invention relates to a switchboard of the self-contained type, as shown in the prior patent to Calkins, No. 1,795,930, issued March 10, 1931.

In the use of such switchboards it has been found necessary at times to separate the upper and base sections of the switchboard after assembly and installation. This requirement may arise, for instance, when it is necessary to move the switchboard to a different location and through a doorway too narrow to pass the assembled board.

In the Calkins type switchboard, as shown in the patent and as used commercially, cabled wires permanently connect the jacks in the upper section of the switchboard to fixed terminal strips in the base section. The many wires from outside cables are also connected to the terminal strips by soldering each wire to a corresponding element in said strip after the switchboard is installed. This arduous soldering operation is performed at great disadvantage, due to the low position of the terminal strips.

It is an important object of my present invention to improve the construction heretofore known and used and as above described, by connecting groups of switchboard jacks by short wires to the jack elements of two-part multiple terminal blocks located closely adjacent the switchboard and permanently mounted in the rear part of the upper section of said board. The plug elements of the two-part terminal blocks are permanently connected to the corresponding wires of the outside cables and may be so connected before the cables are shipped. The advantages of this improved construction will be hereinafter described in detail.

A further object of my invention relates to the provision of an improved means for supporting the cables in the base section and facilitating their separation therefrom when the two sections of the switchboard are to be separated. I have also provided new and improved means for connecting and disconnecting the two-part multiple terminal blocks.

My invention further relates to arrangements and combinations of parts which will be hereinafter described and more particularly pointed out in the appended claims.

A preferred form of the invention is shown in the drawings, in which

Fig. 5 is a plan view of a multiple terminal block;

Fig. 6 is an end view, looking in the direction of the arrow 6 in Fig. 5; and

Fig. 7 is an exploded view of the parts shown in Fig. 6.

Figure 1:
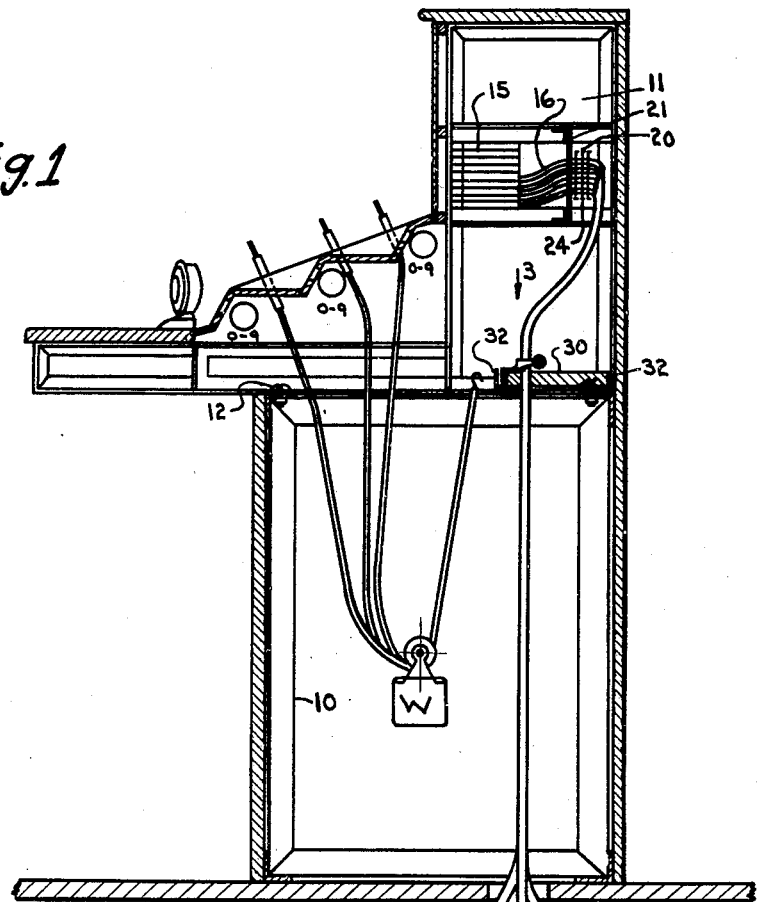
Fig. 1 is a sectional side elevation of my improved switchboard.
Figure 2:
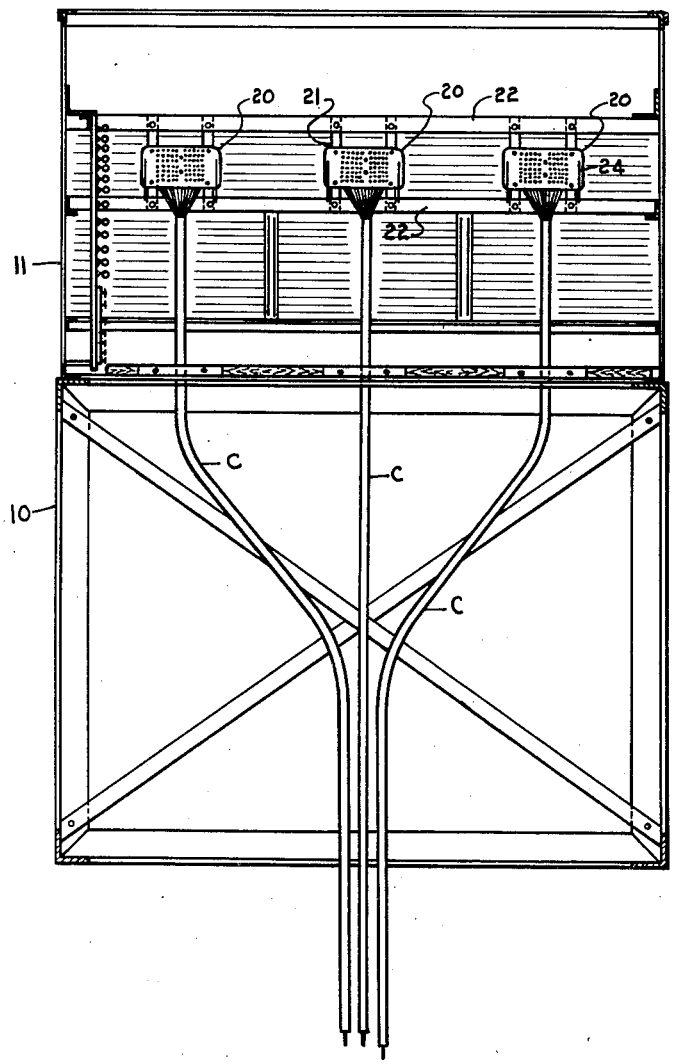
Fig. 2 is a rear elevation thereof, with the back removed and certain parts shown in section.

Referring to Figs. 1 and 2, I have shown my improved switchboard as comprising a base section 10 and an upper section 11, the two sections being held in assembled relation by four or more bolts 12 (Fig. 1). A large number of switchboard jacks or receptacles 15 are mounted in the upper part of the upper section 11 and are connected by wires 16 to the jack sections 23 of a plurality of terminal blocks 20. These jack sections 23 are fixed on mounting strips 21 (Fig. 2) which in turn are secured to transversely extending angle bars 22 fixed in the frame of the upper switchboard section 11.

Outside communicating cables C are brought up through the open base section 10, with the wires contained therein soldered or otherwise permanently secured to plugs in the plug sections 24 of the terminal blocks 20. These permanent connections between the wires in the cables C and the plugs in the plug sections 24 may be conveniently made at the factory and before the equipment is shipped. The wires in each cable should be identified and marked with line numbers before the cable is drawn in at the point of installation.

After installing the switchboard and drawing the cables, it is necessary merely to insert the plug sections 24 of the terminal blocks 20 in the fixed jack sections 23. A supporting cross board 30 may then be dropped loosely in position between fixed frame members or angle 32. The board 30 is provided with notches 33 to loosely receive the cables C, and special clips 35 are provided to support the cables and prevent displacement thereof or engagement of an angle iron 32 thereby.

Figure 3:
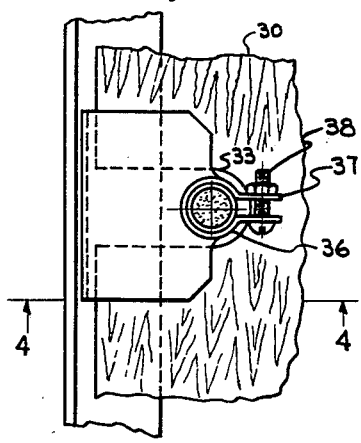
Fig. 3 is a fragmentary plan view of a cable clip, looking in the direction of the arrow 3 in Fig. 1.
Figure 4:
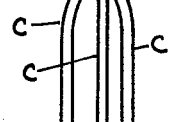
Fig. 4 is a sectional side elevation, taken along the line 4—4 in Fig. 3.

The clips 35 are shown in detail in Figs. 3 and 4 and each comprise a single piece of sheet metal having its front edge portion 36 bent downward to form a depending flange and having the rear edge portion bent upward to provide a cable clamping portion having ears 37 secured together by bolts 38.

If occasion arises after installation for separating the upper switchboard section 11 from the base section 10, the plug sections 24 of the terminal blocks 20 are pulled out and the board 30 is lifted at its rear edge, as indicated in Fig. 4, and is then withdrawn, thus providing a large elongated opening 39 between the supporting angles 32 through which the cables C and plug sections 24 may be passed freely. This permits removal of the switchboard from its usual position and separation of the upper switchboard section 11 from the base section 10 without unsoldering or disturbing any permanent connections in the switchboard.

If the switchboard is to be removed to another location, extension cables of the necessary length may be provided, each having a jack section as 23 at one end and a plug section as 24 at the other. Such extension cables are quickly installed to connect the original cables C to the switchboard jack sections 23 in their new location.

The detailed construction of a preferred form of my improved terminal blocks 20 is shown in Figs. 5 to 7. Each block 20 comprises a jack section 23 and a plug section 24. The jack section 23 includes a base portion 25 and end plates 26 in which spaced studs 40 and 41 are mounted.

As shown in the drawing, the jack sections 23 are each provided with seventy jacks 42 and the plug sections 24 are each provided with seventy plugs 43. The jacks 42 are permanently secured to the jacks 15 on the switchboard, as previously described, and the jack sections 23 are fixed on the mounting strips 21. The plugs 43 are permanently secured to the wires W which collectively form the communicating cables C.

Cam levers 50 are pivotally mounted at each end of each plug section 24, and each cam lever is provided with a projecting cam arm 51 having inner and outer scroll-shaped cam surfaces 52 and 53.

The terminal block 20 is assembled by inserting the ends of the plugs 43 in the openings of the jacks 42 and then swinging the levers 50 as indicated in Fig. 6. This causes the cam arms 51 to enter between the pins 40 and 41 and causes the inner cam surfaces 52 to engage the pins 40 and thus press the plugs 43 firmly into the jacks 42. As seventy plugs are inserted at the same time, substantial pressure is required to assemble these parts.

If it is thereafter desired to separate the plug section 24 from the jack section 23, the levers 50 are swung in the opposite direction, as indicated in Fig. 7, whereupon the outer cam surfaces 53 will engage the pins 41 and exert a cam action to separate the plugs 43 from the jacks 42. My improved terminal blocks are thus very quickly and easily assembled and as quickly and easily separated when so desired.

The separation of the jack wires into three groups, each with a separate terminal block and separate cable, permits any one block to be opened for trouble or test, while the remaining portion of the switchboard is continued in operation.

Having thus described my invention and the advantages thereof, I do not wish to be limited to the details herein disclosed, otherwise than as set forth in the claims, but what I claim is:

1. In a self-contained switchboard comprising upper and lower frame sections detachably secured together and having out-going cables passing downward through both sections, in combination, a cross board removably supported in the lower part of the upper section and having open transverse slots to receive the out-going cables, and clips clamped to said cables and supported by said board and by which clips said cables are upheld and confined in said slots, and said clips having depending forward flanges preventing forward displacement of said cables and protecting said cables from contact with metal parts of said upper frame section, and said cross board being bodily removable from said upper frame section while said cables remain in normal position.

2. In a switchboard, a multiple terminal block comprising a jack section and a plug section, one of said sections having spaced levers with hook-shaped cam projections and the other section having pairs of spaced studs, said cam projections engaging one stud of each pair to draw said sections together when said levers are swung in one direction and engaging the other stud in each pair to separate said sections when said levers are swung in the opposite direction.

3. In a switchboard, a multiple terminal block comprising a jack section and a plug section, one of said sections having a lever at each end with a hook-shaped cam arm provided with inner and outer scroll surfaces, and the other section having pairs of spaced studs at each end, the inner surfaces of said cam arms engaging one stud of each pair to draw said sections together when said levers are swung in one direction, and the outer surfaces of said cam arms engaging the other stud in each pair to separate said sections when said levers are swung in the opposite direction.

4. In a self-contained switchboard, a front portion having a large number of jacks and jack connections, and a plurality of multiple terminal blocks positioned rearward of but adjacent to said front portion, each multiple terminal block comprising a jack section and a plug section, said switchboard having a plurality of outside connection cables, said jack connections being grouped and secured to one section of each terminal block and the wires in one of said cables being connected to the corresponding other section of each terminal block.

5. In a self-contained switchboard, a front portion having a large number of jacks and jack connections, and a plurality of multiple terminal blocks positioned rearward of but adjacent to said front portion, each multiple terminal block comprising a jack section and a plug section, said switchboard having a plurality of outside connection cables, said jack connections being grouped and secured to one section of each terminal block and the wires in one of said cables being connected to the corresponding other section of said terminal block, and means effective to force said terminal block sections together and also to separate said sections.

6. In a self-contained switchboard, a front portion having a large number of jack connections and a plurality of multiple terminal blocks positioned rearward of but adjacent to said front portion, each multiple terminal block comprising a jack section and a plug section, said switchboard having a plurality of outside connection cables, said jack connections being divided into groups with the wires in each group connected to one section of a multiple terminal block and with the wires of one of said cables being connected at its switchboard and to the associated section of said terminal block, whereby each cable in said switchboard may be independently disconnected.

EUGENE L. MENTOR.

REFERENCES CITED

The following references are of record in the file of this patent:

UNITED STATES PATENTS

| Number | Name | Date |
|---|---|---|
| 794,343 | Burt | July 11, 1905 |
| 1,212,699 | Smith | Jan. 16, 1917 |
| 1,809,025 | Cruser | June 9, 1931 |
| 1,901,232 | Glowacki | Mar. 14, 1933 |
| 1,999,497 | Arndt | Apr. 30, 1935 |
| 2,016,475 | Arndt | Oct. 8, 1935 |

FOREIGN PATENTS

| Number | Country | Date |
|---|---|---|
| 616,386 | Germany | July 4, 1935 |